United States Patent [19]

Keefer et al.

[11] 4,155,120

[45] May 15, 1979

[54] APPARATUS AND METHOD FOR CONTROLLING MICROINSTRUCTION SEQUENCING BY SELECTIVELY INHIBITING MICROINSTRUCTION EXECUTION

[75] Inventors: David E. Keefer, Poway; Dongsung R. Kim, Laguna Hills, both of Calif.

[73] Assignee: Burroughs Corporation, Detroit, Mich.

[21] Appl. No.: 856,411

[22] Filed: Dec. 1, 1977

[51] Int. Cl.² ............................................. G06F 9/16
[52] U.S. Cl. ............................................................. 364/200
[58] Field of Search ... 364/200 MS File, 900 MS File

[56] References Cited

U.S. PATENT DOCUMENTS

| | | | |
|---|---|---|---|
| 3,380,025 | 4/1968 | Ragland | 364/200 |
| 3,956,738 | 5/1976 | Tessera | 364/200 |
| 3,964,027 | 6/1976 | Dalmasso | 364/200 |
| 3,990,052 | 11/1976 | Gruner | 364/200 |
| 4,008,462 | 2/1977 | Kanda | 364/200 |
| 4,040,030 | 8/1977 | Cassonnet | 364/200 |

Primary Examiner—Melvin B. Chapnick
Attorney, Agent, or Firm—Nathan Cass; Kevin R. Peterson; Edward J. Feeney, Jr.

[57] ABSTRACT

A microprogrammed digital computer employing a plurality of programmable read only memories containing stored control words which are specially chosen so as to provide for microinstruction sequencing in a manner which in the first instance assumes that no branching possibilities are present, even though one or more branching possibilities may in fact be present in the microinstruction flow path. The correctness of microinstruction sequencing is monitored concurrently with the execution of a microinstruction during each cycle for which a branching decision is required. When an incorrect assumed sequence is detected, correction is provided using microinstruction indexing and inhibiting signals which are selectively provided in response to the states of selected system conditions during the cycle.

26 Claims, 11 Drawing Figures

SEQUENCE CONTROL WORDS SCW
STORED IN SEQUENCE
CONTROL MEMORY 20 (FIG. 1)

| | AA | | | | BI | | | | | | CS |
|---|---|---|---|---|---|---|---|---|---|---|---|
| SCW-T1 | ADDR I | ADDR J | ADDR K | ADDR P | 000 | 101 | 201 | 301 | 401 | 101 | --- | T1 |
| SCW-T2 | ADDR N | --- | --- | --- | 000 | 101 | 201 | 000 | 101 | 000 | --- | T2 |
| SCW-T3 | ADDR E | ADDR F | ADDR G | ADDR H | 000 | 101 | 201 | 301 | 401 | 101 | --- | T3 |
| SCW-T4 | ADDR B | ADDR L | --- | --- | 000 | 101 | 201 | 000 | 101 | 010 | --- | T4 |
| SCW-T0 | --- | --- | --- | --- | 000 | 000 | 000 | 000 | 000 | 000 | --- | T0 |

INDEX 1 2 3 4

APPARATUS AND METHOD FOR CONTROLLING MICROINSTRUCTION SEQUENCING BY SELECTIVELY INHIBITING MICROINSTRUCTION EXECUTION

BACKGROUND OF THE INVENTION

The present invention relates generally to improved means and methods for controlling the operation of digital computers. More particularly, the present invention is directed to improved means and methods for controlling the sequencing and branching of microinstructions in a microprogrammed digital computer.

A particular architectural concept that has allowed for more flexibility in computer design and also in computer programming has been the concept of microinstructions. Initially, a microinstruction was thought of as merely a set of control bits employed within a macroinstruction format. Such control bits were employed to provide a corrective measure during the execution of a multiplying instruction or shift instruction and the like. Gradually, as the microprogramming concept enlarged, the macroinstruction specified the particular routine to be performed, such as the addition of two operands. The execution of the macroinstruction was then accomplished through a sequence of executions of microinstructions, each of which specified the particular gates to be set thereby. Since a plurality of macroinstructions could be implemented by a finite set of microinstructions, it was then apparent that these same mircoinstructions could be stored in a separate storage to be addressed in a particular sequence upon the execution of different macroinstructions. It was further recognized that various sequences of microinstructions could be formulated to carry out the particular operations and separately stored in any memory. Thus, a great variety of sequences of microinstructions could be created to carry out a great variety of routines.

The concept of microinstructions or microprograms, then, became one of providing sub-instructional sets which were masked or hidden from the programmer, thus, simplifying the writing of particular programs by minimizing the number of individual specific steps that had to be called for by the programmer. Furthermore, the concept of microprogramming allows the computer designer to design a more inexpensive computer system that could provide a great variety of routines to the computer user without the requirement of individual functions being implemented in hard-wired circuitry.

Microprogramming may thus be broadly viewed as a technique for designing and implementing the control function of a digital computer system as sequences of control signals that are organized on a word basis and stored in a fixed or dynamically changeable control memory. Detailed examples of some known approaches to the design of microprogrammed digital computers can be found in the book by S. S. Husson, "Microprogramming: Principles and Practices", Prentice-Hall, Inc. (1970), the contents of which are to be regarded as incorporated herein by this reference.

As will be apparent from the referenced Husson book, a prior art microprogram control memory may typically comprise a selectively addressable control memory having microinstruction control words stored at selectable addressable locations thereof. Normally, microinstruction control words are accessed sequentially from the control memory. In order to provide for branching, each control word may typically include, in addition to the microinstruction bits, special next address bits and test select bits which are applied to branching logic along with system condition signals to determine the address of the next microinstruction.

As the computer art progressed, a need arose for greater numbers and types of stored microinstruction control words to be available from the microinstruction memory which led to the provision of Read/Write microinstruction memories in which selected microinstructions could be provided from the processor main memory under program control so as to give the programmer the ability to modify the microinstruction control words in the microinstruction memory. Examples of such Read/Write microinstruction memories will be found in U.S. Pat. Nos. 3,478,322; 3,792,441 and 3,739,352.

One result of the provision of Read/Write microinstruction memories has been to permit greater control and flexibility over the particular microinstruction sequencing to be provided by a data processor as it performs its various programs. However, it has been found difficult to provide for optimization of microinstruction sequencing because of the wide variety of microinstruction flow paths which may occur in executing a program, for example, because of the many possible branching (i.e. conditional sequencing) options which are typically provided in the microinstruction flow path, each branch point normally requiring a longer time to determine the proper branch as compared to the time required when an unconditional sequence situation is present. Thus, although a data processor may provide a relatively fast performable single microinstruction cycle, the performance of a data processing operation may nevertheless not be optimum because of the particular microinstruction flow path which the data processor is caused to follow in performing the operation and the time required to make the various branching decisions. The difficulties in optimizing a data processing operation are further complicated by the fact that the provision of a particular microprogram flow path in order to optimize one type of operation may deleteriously affect the performance of other operations.

SUMMARY OF THE PRESENT INVENTION

Accordingly, it is the primary object of the present invention to provide improved means and methods for providing more optimum execution of a microinstruction flow path in a microprogrammed data processor.

Another object of the invention is to provide a microprogrammed data processor having improved means for controlling its microinstruction flow operations during the performance of a data processing operation.

A further object of the invention is to provide improved means and methods for reducing the time required to perform branching in a microprogrammed data processor.

The above objects are accomplished in a preferred embodiment of the invention by the provision of a microprogramming system which provides for the performance of a data processing operation using a microinstruction sequence which in the first instance assumes that no branching possibilities are present (i.e. each microinstruction sequence is assumed to be unconditional), even though one or more brancing possibilities may in fact be present in the microinstruction flow path of the data processing operation. Accordingly, in the preferred embodiment disclosed herein, each microinstruction accessed from a microinstruction memory is accompanied by next address data which indicates the next microinstruction to be executed and which is available for use without the need to wait for the results of any system conditions testing, thereby providing for rapid microinstruction sequencing.

The above described rapid microinstruction sequencing is permitted to occur in the preferred embodiment disclosed herein so long as the assumed microinstruction flow conforms to the correct path required for the operation being performed, the correctness of microinstruction sequencing being monitored concurrently with the execution of each microinstruction for which a branching decision is required. When an incorrect assumed branching is detected, a correction cycle involving the present cycle, the next cycle or both is initiated to correct the microinstruction sequence and thereby maintain the sequence on the correct path. Thus, it is only when the assumed sequencing is incorrect that the normal rapid sequencing is interrupted, if necessary, in order to provide a correction. However, the number of times that correction need be made during performance of an operation can readily be minimized based on operating experience without the need of any hardware change simply by changing the next microinstruction address data accompanying the microinstructions so that the assumed microinstruction sequence is correct most of the time. Furthermore, in accordance with the invention, provision is made to implement the sequence correction operation in a particularly advantageous manner so as to facilitate correction, while also taking advantage of situations which make it possible to mask the correction time.

The specific nature of the invention as well as other objects, features, advantages and uses thereof will become evident from the following detailed description taken in conjunction with the accompanying drawings.

DETAILED DESCRIPTION OF THE INVENTION

Like numerals and characters represent like elements throughout the figures of the drawings.

Figure 1:
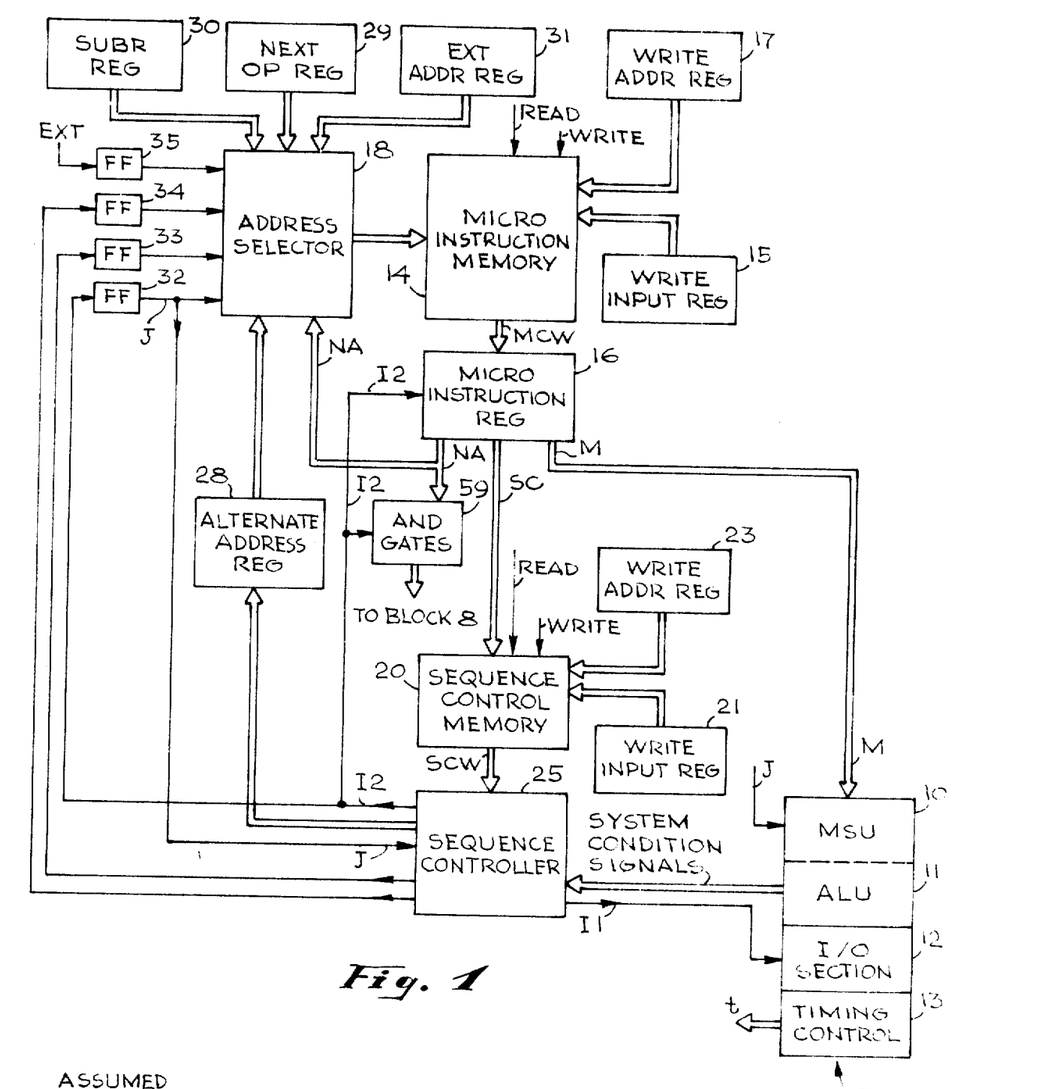
FIG. 1 is a block diagram of a digital data processing system employing microprogramming control means in accordance with the invention.

Reference is initially directed to FIG. 1 which illustrates a digital data processing system employing microprogramming control means in accordance with the invention. For the sake of simplicity, block 8 in FIG. 1 represents conventional portions of a digital data processing system which may be employed in conjunction with the exemplary embodiment of the microprogramming control means of the present invention illustrated in the remaining portions of FIG. 1. As indicated, block 8 includes a memory storage unit (MSU) 10, an arithmetic logic unit (ALU) 11, an Input/Output Section (I/O) 12, and a timing control 13, each of which may be provided in any of a variety of well known forms presently available in the art.

A Read/Write microinstruction memory 14 in FIG. 1, which is preferably a programmable read-only memory (PROM), is provided to store a plurality of microinstruction control words. In a conventional manner, a selected microinstruction control word MCW is read out from microinstruction memory 14 into a microinstruction register 16 in response to a Read signal and an address provided by an address selector 18. It is to be understood that microinstruction memory 14 not only includes reading means but also includes writing means including a write input register 15 and a write address register 17 which, in response to a Write signal, permit control words to be written into the memory and/or modified, also in a conventional manner.

Figure 2:
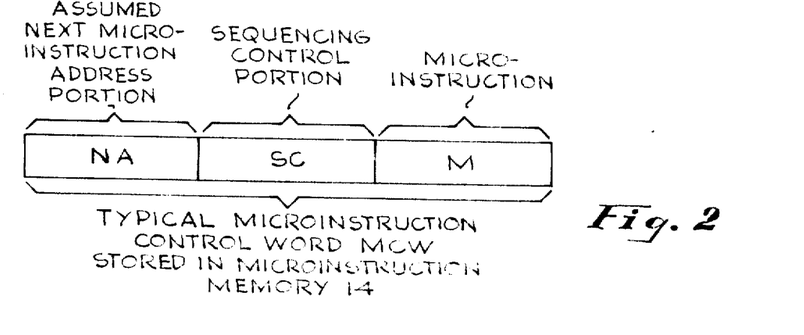
FIG. 2 illustrates the format of a typical microinstruction control word stored in the microinstruction memory 14 of FIG. 1.

FIG. 2 typically illustrates the format of a microinstruction control word MCW which is read into microinstruction register 16 from microinstruction memory 14. As shown, each control word includes a microinstruction M, a sequencing control portion SC, and a next address portion NA. As is well known, microinstruction M typically comprises a plurality of bits which are applied to the elements of block 8 in FIG. 1 in order to provide for the performance of a particular microoperation as determined by the values of the bits making up the microinstruction. A typical manner in which microinstruction execution may be performed is illustrated, for example, in U.S. Pat. No. 4,038,643.

The next address portion NA of the typical control word illustrated in FIG. 2 contains bits designating an assumed next microinstruction address. These NA bits may themselves designate the next microinstruction address, or else, may cause address selector 18 to select the address in one of the auxiliary address registers 28, 29 or 30 as the next microinstruction address. As will hereinafter be considered in further detail, this next address portion NA is directly available from microinstruction register 16 for use in accessing the next microinstruction independently of the results of the execution of the current microinstruction and without the need of any system condition testing.

The sequencing control portion SC of the typical microinstruction control word illustrated in FIG. 2 contains sequence control data bits for use in providing correct microinstruction sequencing in the event that the next microinstruction is not to be that designated by the next address NA portion of the microinstruction control word. As will hereinafter be described in more detail, this sequencing control portion SC is applied as an address to a sequence control Read/Write memory 20 in FIG. 1 which, like microinstruction memory 14, is preferably also a PROM. Also, like memory 14, writing means including a write input register 21 and a write address register 23 are provided to permit sequence control words to be written into memory 20 and/or modified.

Before continuing with the description of FIG. 1, the timing relationships which may typically be employed in connection with the particular embodiment of the invention being disclosed herein will be briefly considered. Although timing may be provided in a variety of known ways for a microprogrammed digital data processing system in accordance with the invention, it will be assumed for illustrative purposes that timing within the data processing system illustrated in FIG. 1 is synchronous with one microinstruction being performed during each machine cycle. It will also be assumed that all registers and flip-flops are set at the same time by a clock occurring at the end of each cycle, as shown in the upper graph of FIG. 3. A typical manner in which the logic interconnecting the flip-flops and registers may be controlled in accordance with the microinstruction signals M read into the microinstruction register 16 in FIG. 1 is illustrated for example in FIG. 4 of the aforementioned U.S. Pat. No. 4,038,643.

It will be understood that the operating speed of the logic in the system is such that valid results of the logical operations performed during each machine cycle are applied to the inputs of the registers and flip-flops in time to be set by the clock occurring at the end of the machine cycle. It is also to be understood that the timing control 13 illustrated in block 8 of FIG. 1 provides appropriate timing signals t in a conventional manner to the microinstruction memory 14 and the sequence control memory 20 as well as to the various registers, flip-flops, logic and other circuits in the data processor to provide appropriate timing therefor. In order not to confuse the drawings, the particular timing signals fed to these various elements will not be shown in the drawings, but are to be assumed as provided where appropriate.

The description of the embodiment of the invention illustrated in FIG. 1 will now be continued in the light of timing relationships considered above. It is to be understood that, in the embodiment being described, three types of operations normally occur concurrently during each current cycle as follows: (1) in response to an address provided by address selector 18, a microinstruction control word is read out from microinstruction memory 14 and set up in microinstruction register 16 at the clock occurring at the end of the current cycle unless inhibited by an inhibit signal I2 (which will be explained hereinafter); (2) the microinstruction M set up in microinstruction register 16 at the end of the previous cycle is executed during the current cycle and the results set up in the flip-flops and registers at the clock occurring at the end of the current cycle unless inhibited by an inhibit signal I1 (which will also be explained hereinafter); and (3) the sequence control portion SC of the microinstruction control word MCW contained in microinstruction register 16 during the current cycle addresses sequence control memory 20 during the current cycle to select a sequence control word SCW which, in conjunction with applied system condition signals (including signals produced during microinstruction execution), determines whether the assumed next microinstruction address NA contained in microinstruction register 16 during the current cycle is correct—if not, controller 25 provides for correcting microinstruction sequencing by selectively setting alternate address register 28 and flip-flops 32-35 at the clock occurring at the end of the cycle, and by selectively producing one or both of inhibit signals I1 and I2 (see the lower two graphs in FIG. 3).

As illustrated in FIG. 1, address selector 18 has a plurality of possible next addresses applied thereto, only one of which is selected in response to address selection flip-flops 32-35 for addressing a microinstruction control word in microinstruction memory 14 at the beginning of each machine cycle. The various possible microinstruction addresses illustrated in FIG. 1 are as follows: (1) address NA in microinstruction register 16; (2) one of a plurality of alternate next addresses set up in an alternate address register 28 by sequence controller 25; (3) a next operation starting address stored in a next operation address register 29 and indicating the starting microinstruction address of the next operation to be performed; (4) a subroutine return address stored in a subroutine return address register 30 for indicating the microinstruction address to which a microinstruction flow is to be returned after performing a subroutine; and (5) an external microinstruction address stored in an external address register 31 indicating, for example, an interrupt microinstruction starting address to be used during an interrupt operation.

In the particular embodiment being described herein, the operation of address selector 18 is such that, at the beginning of each cycle, it automatically selects the assumed next microinstruction address indicated by the next address portion NA contained in microinstruction register 16 for application to microinstruction memory 14 unless one of flip-flops 32-35 is true. If only flip-flop 32 is true, then address selector 18 selects the address in alternate address register 28 for use as the microinstruction address; if flip-flops 32 and 33 are true, address selector 18 selects the alternate address contained in next operator register 29 for use as the microinstruction address; if flip-flops 32 and 34 are true, address selector 18 selects the address in subroutine address register 30 for use as the microinstruction address; and if flip-flops 32 and 35 are true, address selector 18 selects the address in external address register 31 for use as the microinstruction address. It is to be understood that flip-flops 32-35 are of a type which are set at each clock in accordance with the true or false state applied to the flip-flop input when the clock occurs.

Figure 4:
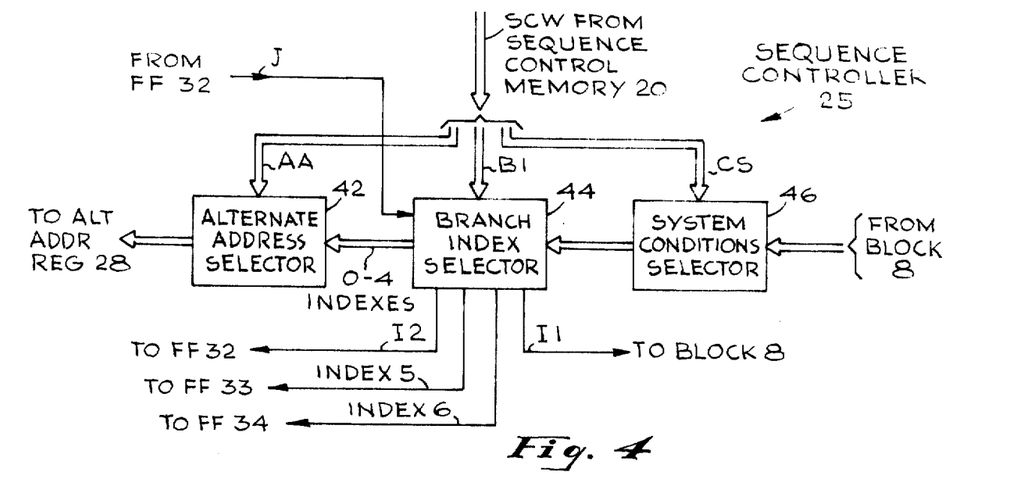
FIG. 4 is an electrical block diagram illustrating a preferred embodiment of the sequence controller 25 in FIG. 1.
Figure 5:
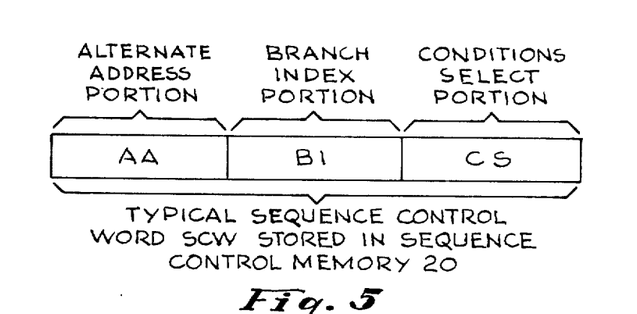
FIG. 5 illustrates the format of a typical sequence control word stored in the sequence control memory 20 of FIG. 1.

The detailed description of the invention will now be continued with reference to FIG. 4 which illustrates a preferred embodiment of the sequence controller 25 in FIG. 1, and also to FIG. 5 which illustrates the format of a sequence control word SCW applied to sequence controller 25.

Figure 3:
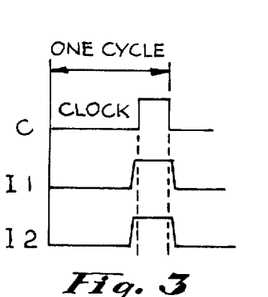
FIG. 3 illustrates time relationships provided in the system of FIG. 1.

As shown in FIG. 5, each sequence control word SCW comprises an alternate address portion AA, a branch index portion BI, and a conditions select portion CS which, as shown in FIG. 3, are respectively applied to an alternate address selector 42, a branch index selector 44, and system conditions selector 46 of sequence controller 25. The alternate address portion AA comprises one or more alternate microinstruction addresses. The conditions select portion CS provides condition selection data for determining which of a plurality of system condition signals are to be selected during the cycle. For example, the CS data may provide for selecting four out of a much larger number of system conditions provided by block 8 in FIG. 1. The branch index portion BI provides a plurality of sub-portions containing indexes and inhibit signal indications for determining and controlling which of various possible next microinstructions to which the microinstruction flow may sequence following execution of the current microinstruction.

Sequence controller 25 will now be considered in more detail in connection with FIG. 4. As shown, the conditions select portion CS of the sequence control word SCW is applied to conditions select logic 46 for determining which of a plurality of applied system condition signals are to be selected during execution of the current microinstruction. One possible form of circuit which could be used for system conditions selector 46 is illustrated in FIG. 7 of the aforementioned U.S. Pat. No. 4,038,643. However, since only simple selection logic is required for system conditions selector 46 in the preferred embodiment being considered herein, system conditions selector 46 is preferably implemented in the conventional form of a commercially available multiplexer using large scale integrated circuit chips. In such an implementation, the system condition signals applied to system conditions selector 46 from block 8 (FIG. 1), would constitute the multiplexor inputs, the conditions select portion CS of the sequence control word SCW would serve as selection signals for the multiplexor, and the multiplexor output signals would constitute the results of the selection. Address selector 18 in FIG. 1 as well as branch index selector 44 and alternate address selector 46 in FIG. 4 may similarly be implemented as multiplexors, since only straightforward selection is required to be provided by these circuits. Accordingly, these various selection operations can be performed very rapidly without the need to extend cycle operating time, thereby permitting true inhibit signals I1 and I2 to be provided, where appropriate, to inhibit the clock occurring at the end of the current cycle as will hereinafter be considered in connection with FIG. 3.

The output of system conditions selector 46 may typically comprise four bits corresponding to the states of four system conditions selected in response to the CS portion of the accessed sequence control word SCW. This four bit output of system conditions selector 46 is applied to branch index selector 44 for selecting one of up to 16 sub-portions which may, for example, be provided in the branch index portion BI of the sequence control word SCW. Since the preferred embodiment requires that only seven indexes be incorporated in the branch index sub-portions, redundancy may be provided to permit the selection to be simplified without detracting from the overall system conditions testing capability. In the particular embodiment being considered herein, it will be assumed, for example, that each sub-portion of BI includes one of seven index values having the following meanings: index 0 indicates that the assumed next microinstruction address in the next address portion NA of the microinstruction control word MCW currently stored in microinstruction register 16 is to be used as the next microinstruction; indexes 1–4 each designate a respective one of four alternate next microinstruction addresses provided by the alternate address portion AA of the sequence control word SCW; index 5 designates a Return to Subroutine next microinstruction indicating that the address in subroutine return address register 30 (FIG. 1) contains the address of the next microinstruction; and index 6 designates an End of Operation condition indicating that the address in next operator address register 30 (FIG. 1) contains the address of the next microinstruction. As will be considered in more detail hereinafter, each sub-portion of BI, in addition to one of the above index values, also includes a plurality of inhibit bits indicating whether none, one, or both of inhibit signals I1 and I2 are to become true during the current cycle.

As shown in FIG. 4, indexes 1–4 are applied to alternate address selector 42, while indexes 5 and 6 are respectively applied to flip-flops 32 and 33, there being no 0 index output. Thus, selection of a sub-portion containing a 0 index by branch index selector 44 during a current cycle is an indication that the assumed next microinstruction indicated by the NA portion of MCW in microinstruction register 16 is correctly to be used as the next microinstruction address.

Next to be considered is the effect of branch index selector 44 selecting a sub-portion containing one of the other indexes 1–6. Considering first indexes 1–4, it will be seen in FIG. 4 that index 1–4 output lines from branch index selector 44 are applied to alternate address selector 42 for use in selecting a corresponding one of four alternate next microinstruction addresses provided by the alternate address portion AA of the sequence control word SCW. Accordingly, when a sub-portion containing one of indexes 1–4 is selected by branch index selector 44, the corresponding alternate address is applied via alternate address selector 42 to alternate address register 28 (FIG. 1) and is set up therein at the clock occurring at the end of the current cycle. Selection of a sub-portion containing index 5 by branch selector 44 (which signifies a Return to Subroutine next microinstruction) causes return to subroutine flip-flop 32 to be set true by the clock occurring at the end of the current cycle, while selection of a sub-portion containing index 6 (which signifies an End of Operation situation) causes next operator flip-flop 33 to be set true by the clock occurring at the end of the current cycle.

In summary, therefore, it will be understood that selection by branch index selector 44 (FIG. 3) of a sub-portion containing one of indexes 1–6 during a current cycle serves the following purposes: (1) it signifies that the assumed next microinstruction indicated by the next address portion NA contained in microinstruction register 16 (FIG. 1) during the current cycle is incorrect; and (2) the particular one of indexes 1–6 selected identifies the correct next microinstruction address and provides for setting address register 28 or a respective one of address selection flip-flops 32 and 33 accordingly at the clock occurring at the end of the current cycle, as described in the previous paragraph.

The manner in which correct microinstruction sequencing is advantageously provided for in accordance with the invention by appropriate use of inhibit signals I1 and I2 will next be described in connection with the preferred embodiment being described herein. As mentioned previously, each sub-portion provided in the branch index portion B1 of the sequence control word SCW read out from sequence memory 20 (FIG. 1) includes, along with one of indexes 0–6, inhibit bits which cause branch index selector 44 (FIG.4) to selectively provide true states for inhibit signals I1 and I2 during the current cycle. As shown in FIG. 3, each of inhibit signals I1 and I2, when true during a cycle, occur with an overlapping time relationship relative to clock C so as to thereby be able to inhibit application of clock C to a flip-flop or register. This may be accomplished, for example, as illustrated by the clock inhibiting circuit shown in FIG. 6 in which an AND gate 51 is provided in the clock input line. As will be seen from FIG. 6, an inhibit signal I is applied to one input of AND gate 51 via inverter 53, while clock C is applied to the other input of AND gate 51. Thus, when I occurs, clock C will be inhibited from appearing at the output of AND gate 51. The functioning of inhibit signals I1 and I2 in the preferred embodiment being described will next be considered.

Inhibit signal I1 is applied to the various flip-flops and registers which store the results of microinstruction execution in a manner so that when I1 becomes true it inhibits application of clock C to these flip-flops and registers during the cycle. This may be accomplished, for example, using the clock inhibiting circuit shown in FIG. 6. Thus, it will be understood that when I1 becomes true at the end of a cycle (see FIG. 3), it prevents the flip-flops and registers which store the results of microinstruction execution from changing during that cycle. Consequently, the selection of a sub-portion which results in producing a true inhibit signal I1 during a cycle has the effect of preventing storage of the results of the microinstruction being executed during the cycle, thereby inhibiting execution of the microinstruction currently stored in microinstruction register 16 (FIG. 1) during the cycle.

Figure 6:
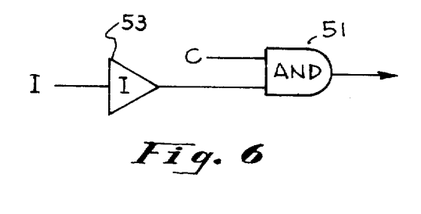
FIGS. 6 and 7 are electrical circuit diagrams of logical circuits employed in the system of FIG. 1 for inhibiting application of the clock to selected flip-flops and registers.

Considering now inhibit signal I2, it will be seen (FIG. 1) that I2 is applied to microinstruction register 16 so that, when I2 becomes true, it inhibits the setting of microinstruction register 16 by the clock occurring at the end of the cycle during which a true state of I2 occurs. The microinstruction control word MCW in microinstruction register 16 will thus remain unchanged. To accomplish this purpose, microinstruction register 16 may, for example, include a clock inhibiting circuit as illustrated in FIG. 6. It will be understood that by thus providing for inhibiting the setting of microinstruction register 16 during a current cycle makes it possible to prevent an incorrect assumed next microinstruction control word from being set up therein in response to an incorrect NA portion contained in microinstruction register 16 during the current cycle. Besides inhibiting the setting of microinstruction register 16, inhibit signal I2 also inhibits AND gates 59 in FIG. 1 to prevent incorrect assumed next microinstruction information contained in the NA portion of microinstruction register 16 during a current cycle from being applied to other parts of the processor.

Figure 7:
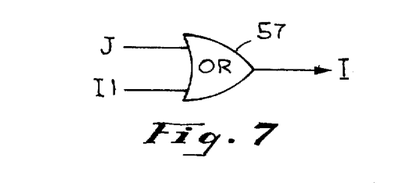

Inhibit signal I2 additionally serves another purpose, namely, to set flip-flop 32 (FIG. 1) true at the clock occurring at the end of the cycle during which a true I2 signal occurs. Thus, output J of flip-flop 32 will be true during the next following cycle and is used for various purposes during this next cycle as follows: (1) signal J when true serves in a similar manner as that previously described for a true inhibit signal I1—that is, to inhibit microinstruction execution—which may be accomplished, for example, by ORing J with I1 in an OR gate 57 as shown in FIG. 7 to produce a resultant inhibit signal I which may be used for inhibiting application of clock C using, for example, the previously considered clock inhibiting circuit of FIG. 6; (2) signal J is applied to address selector 18 in FIG. 1 to cause an alternate address residing in alternate address register 28 to address microinstruction memory 14 during a cycle that J is true; and (3) signal J is applied to branch index selector 44 in FIG. 4 to inhibit operation thereof so that no system condition testing occurs during a cycle during which J is true.

Having described the functions of inhibit signals I1 and I2 provided by branch index selector 44 in FIG. 4, and also the functions of signal J provided by flip-flop 32 (FIG. 1), the manner in which these signals I1, I2 and J may advantageously be employed to provide correct microinstruction sequencing in accordance with the invention will now be considered in further detail by reference to FIGS. 8-11 which illustrate an example of how microinstruction sequencing may be provided in the preferred embodiment being described herein.

Figure 8:
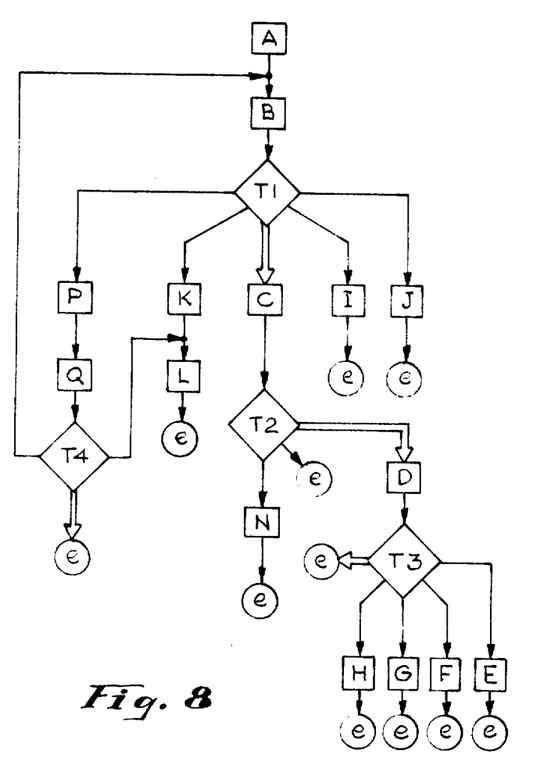
FIG. 8 is a flow chart illustrating an example of a typical microinstruction flow structure which may be implemented in the system of FIG. 1.

FIG. 8 illustrates an example of a typical microinstruction flow structure which may advantageously be implemented in the preferred embodiment of the invention being described herein. Each of the blocks in FIG. 8 (e.g., blocks A, B, C, etc.) is a microinstruction block representing the performance of the particular labeled microinstruction in a single machine cycle. Each of the blocks (e.g., T1, T2, T3, etc.) in FIG. 8—which are angularly rotated 90° relative to the microinstruction blocks—is a decision block in which a decision is made as to which of a plurality of possible next microinstructions is to be the next microinstruction, the decision being based on the states of the particular set of system conditions selected by systems condition selector 46 during the cycle. It will be understood from the previous description provided herein that, in the preferred embodiment being described, the sequencing decision indicated by a decision block in FIG. 8 is provided during the same cycle as the execution of the corresponding microinstruction whose output is shown flowing to the decision block in FIG. 8. Each circled "e" designation in FIG. 8 signifies an end of operation condition, in which case the next microinstruction is the starting microinstruction of the next operation, the address of which is contained in next operation register 29 in FIG. 1. The double flow lines in FIG. 8 illustrate assumed microinstruction paths which are provided in accordance with the invention by appropriate choice of next microinstruction address NA values in the applicable microinstruction control words MCW contained in microinstruction memory 14 in FIG. 1, as will next be considered with reference to FIG. 9.

Figure 9:
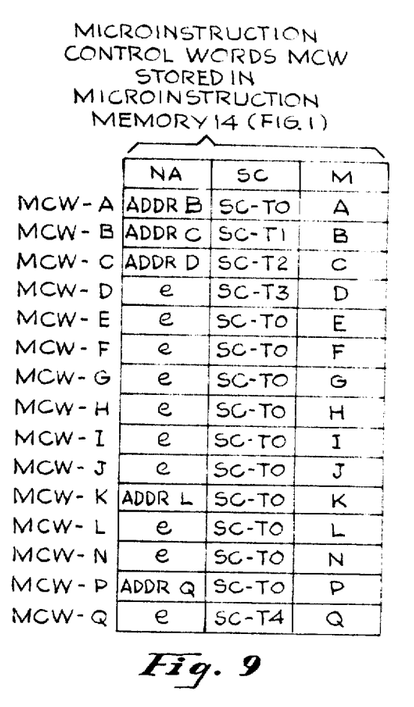
FIG. 9 illustrates a plurality of microinstruction control words stored in microinstruction memory 14 in FIG. 1 and chosen in accordance with the microinstruction flow illustrated in FIG. 8.

FIG. 9 illustrates a plurality of microinstruction control words MCW-A, MCW-B, etc. (of the type typically illustrated in FIG. 2) stored in microinstruction memory 14 which are chosen so as to implement the microinstruction flow shown in FIG. 8. For example, the assumed next addresses NA in FIG. 9 provided for control words MCW-A, MCW-B, and MCW-C containing microinstructions A, B, and C are addr B, addr C, and addr D, respectively, in conformance with FIG. 8. As other examples, it will be seen that microinstruction control words MCW-D, MCW-E, MCW-F, MCW-G, MCW-H, MCW-I and MCW-J in FIG. 9 containing microinstructions D, E, F, G, H, I and J, respectively, each contain an "e" assumed next address NA, again in conformance with FIG. 8, an "e" indicating that the assumed next address is the next operation starting microinstruction address contained in next operation register 29 in FIG. 1. It is of particular significance to note that an assumed next address is provided for each sequence control word in FIG. 9 even though a branching decision is required to determine the next microinstruction. For example, note that, in conformance with the double lines in FIG. 8, microinstruction control word MCW-B assumes a next microinstruction NA of addr C, while MCW-C assumes a next microinstruction address NA of addr D.

It will thus be understood that an operation requiring the microinstruction sequence A, B, C, D, e, which conforms to the assumed flow shown in FIG. 8, would be performed in just five machine cycles without the need to wait for any system conditions testing in order to provide branching decisions even though this sequence passes through the three decision blocks T1, T2 and T3 shown in FIG. 8, each of which requires the testing of particular system conditions. When such system condition testing occurs at a branching point in a conventional microprogramming system, extra time is normally required in order to permit a branching decision to be made.

As will be remembered from the previous consideration of FIG. 2, each microinstruction control word MCW stored in microinstruction memory 14 also includes a sequence control portion SC. In FIG. 9 each sequence control portion has a particular T designation added thereto indicating, in conformance with FIG. 8, a particular set of system conditions, if any, which are to be selected during the same cycle that the associated microinstruction is being executed for use in making a branching decision. For microinstruction control words which in accordance with FIG. 8 do not require a branching decision to be made, such as, for example, MCW-A, MCW-E, etc., the SC portions thereof are provided with a T0 designation indicating a no branch situation in which case no system condition selection is required during the cycle. On the other hand, for microinstruction control words, such as for example MCW-B and MCW-C which in accordance with FIG. 8 require that a branching decision be made, the SC portions thereof are provided with a T indication representing the particular set of system conditions which are selected during the cycle for making the branching decision. For example, MCW-B has a SC-T1 sequence control portion while MCW-C has a SC-T2 sequence control portion, wherein T1 represents one set of selected system conditions, while T2 represents a different set of selected system conditions.

Figure 10:
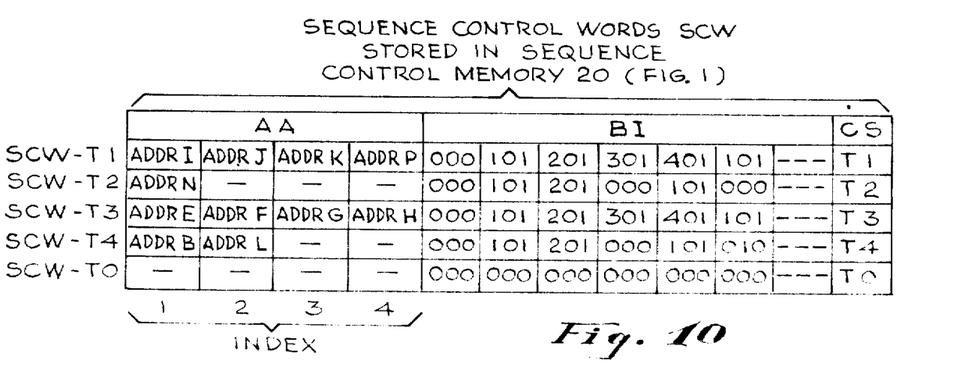
FIG. 10 illustrates a plurality of sequence control words stored in sequencing control memory 20 in FIG. 1 and chosen in accordance with the microinstruction flow illustrated in FIG. 8.

FIG. 10 illustrates the contents of a plurality of sequence control words SCW-T0, SCW-T1, etc. stored in sequence control memory 20 in FIG. 1, which are addressed by the respective sequence control portions SC-T0, SC-T1, etc. of the microinstruction control words illustrated in FIG. 9 during a cycle that the corresponding microinstruction is being executed. It will be remembered from the previous consideration of a typical sequence control word in connection with FIG. 5 that it contains a conditions select portion CS, a branch index portion BI, and an alternate address portion AA. Each conditions select portion CS in FIG. 10 serves to cause system conditions selector 46 in FIG. 4 to select from the plurality of system conditions provided by block 8 (FIG. 1) the particular set of system conditions which are to be used during the cycle by branch index selector 44 in selecting a branch index sub-portion for use in controlling branching. For example, if block 8 provided 120 system conditions $C_1$-$C_{120}$, T1 could represent the selection of the four independent conditions $C_1$, $C_2$, $C_{59}$ and $C_{120}$.

Each alternate address portion AA of a sequence control word in FIG. 10 comprises one or more microinstruction addresses (chosen in accordance with FIG. 8) which may be selected by alternate address selector 42 in FIG. 1 for use as the next microinstruction address in the event that the assumed next microinstruction is incorrect. For example, sequence control word SCW-T3 in FIG. 10 will be seen to provide alternate addresses addr E, addr F, addr G and addr H in its alternate address portion in accordance with decision block T3 in FIG. 8.

The remaining portion to be considered in each of the typical sequence control words illustrated in FIG. 10 is the branch index portion BI. It will be remembered from the previous consideration of a typical sequence control word in FIG. 5 that the branch index portion BI provides a plurality of sub-portions, each including an index value indicating the correct next microinstruction along with inhibit bits which determine whether inhibit signals I1 and/or I2 are to become true or both remain false during the cycle. Typically, the branch index portion BI may contain up to 16 selectable sub-portions (corresponding to four selected system conditions provided by system conditions selector 46 in FIG. 4) which may be chosen as desired to provide an appropriate variety of combinations of index and I1 and I2 values.

The branch index portions BI of each of the sequence control words in FIG. 10 are accordingly chosen in the preferred embodiment being considered to provide sub-portions having indexes and inhibit signal indications which will be able to provide for the various possible microinstruction flow paths indicated following each decision block in the microinstruction flow structure illustrated in FIG. 8. For example, it will be noted in FIG. 8 that decision block T1 may cause the flow to sequence to the assumed next microinstruction C or to one of alternate next microinstruction I, J, K or P. Thus, the branch index portion BI of sequence control word SCW-T1 (which is accessed during the cycle that microinstruction B is being executed) will at least contain branch index sub-portions designated in FIG. 10 as 000, 101, 201, 301 and 401, wherein the most significant digit of each such sub-portion designates one of the seven possible indexes 0–6, while the remaining two digits (which are either "1" or "0") respectively indicate whether I2 and/or I1 are to become true, a "1" indication corresponding to true, and the least significant digit corresponding to I2. Note that certain sub-portions (such as 000 and 101 for SCW-T1) are redundantly provided in the branch index portions BI, which has the advantage of simplifying selection in the event that the same sub-portion is to be selected for more than one combination of values of the selected system conditions. Note also that sub-portion 000 is provided at least once for all BI portions, since it is selected when the assumed next microinstruction is correct and is usually accompanied by "0" indications for both I1 and I2. Since the selection of SCW-T0 corresponds to a no branch situation, all of its sub-portions are typically chosen to be 000.

It will thus be understood from the foregoing that sub-portion 101 of sequence control word SCW-T1 in FIG. 10 indicates an index of 1 calling for selection of addr I by alternate address selector 42 in FIG. 4, while the next following digits 0 and 1 indicate that I1 is to remain false while I2 is to become true during the cycle. As another example, sub-portion 201 in the BI portion of SCW-T1 in FIG. 10 indicates an index of 2 calling for selection of addr J along with the selection of false and true states, respectively, for I1 and I2.

At this point in the description, it will be useful to note that the present invention advantageously provides for expeditiously changing the assumed microinstruction flow path provided for a microinstruction flow structure such as illustrated by the double flow lines in FIG. 8 merely by appropriately modifying the next address portions NA of one or more of the microinstruction control words stored in microinstruction memory 14, and by correspondingly modifying appropriate ones of the sequence control words stored in sequence control memory 20 in FIG. 1. For example, assume that the microinstruction flow structure illustrated in FIG. 8 is to be modified so that the assumed flow is from microinstruction C to microinstruction N rather than from C to D. The implementation of this different assumed microinstruction flow path may readily be accomplished by: (1) changing the next address portion NA of microinstruction control word MCW-C in FIG. 9 from addr D to addr N; (2) changing addr N in the alternate address portion AA of sequence control word SCW-T2 in FIG. 10 to addr D; and (3) interchanging the locations of sub-portions 000 and 101 of the branch index portion BI of SCW-T2 so that the sub-portion 000 (indicating a correctly assumed next microinstruction) will be selected when the results of system condition testing indicates that N is the next microinstruction. It should thus now be apparent how the present invention advantageously permits the assumed microinstruction flow path to readily be chosen or modified to provide the fastest possible execution time for a computer operation without requiring any hardware change.

Figure 11:
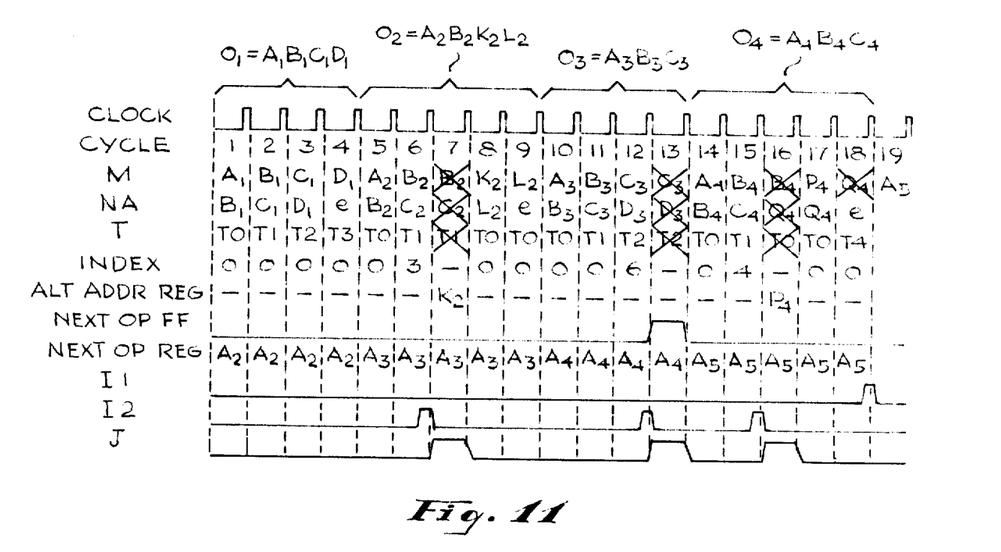
FIG. 11 is a series of graphs illustrating examples of microinstruction sequencing which may be provided in the system of FIG. 1 in accordance with the invention.

Typical operation of the preferred embodiment of the invention will now be considered in more detail in connection with FIG. 11. For this purpose, the applicable microinstruction flow structure will be assumed to be that shown in FIG. 8 having the assumed microinstruction flow paths indicated by the double flow lines. It will also be assumed that this microinstruction flow structure of FIG. 8 is implemented by microinstruction control words stored in microinstruction memory 14 (FIG. 1) as illustrated in FIG. 9 in conjunction with sequence control words stored in sequence control memory 20 as illustrated in FIG. 10. It will further be assumed that four operations $O_1$, $O_2$, $O_3$ and $O_4$ are to be consecutively performed which will be designated as: $O_1 = A_1B_1C_1D_1$; $O_2 = A_2B_2K_2L_2$; $O_3 = A_3B_3C_3$; and $O_4 = A_4B_4P_4$; wherein A, B, C, etc. respectively correspond to like designated microinstructions in FIGS. 8–10, and wherein the subscript provided for each microinstruction designates the particular one of the three operations to which the respective microinstruction corresponds.

The top graph in FIG. 11 illustrates the clock occurring during each of a plurality of machine cycles. The next lower cycle graph in FIG. 9 indicates the number of cycles which have occurred since the start of the four operations $O_1$, $O_2$, $O_3$ and $O_4$ being performed in this illustrative example. The next lower graph M in FIG. 11 indicates the particular microinstruction contained in microinstruction register 16 (FIG. 1) during each cycle and is the particular microinstruction executed during the cycle unless inhibited by a true I1 inhibit signal or by a true J signal occurring during the cycle. The I1 inhibit signal during these assumed operations is illustrated by the I1 graph in FIG. 9 and the signal J is illustrated by the J graph in FIG. 11. As pointed out previously, signal J provided by flip-flop 32 in FIG. 1 is set true by a true I2 inhibit signal occurring during the preceding cycle, the I2 inhibit signal occurring during these assumed operations being illustrated by the I2 graph in FIG. 11. An "X" provided over a microinstruction or other symbol in FIG. 11 during a cycle (e.g., see cycles 7, 13 and 16) indicates that the normal operations represented by the symbol has been overcome as a result of the inhibiting action of I1, I2 or J during the cycle.

Continuing with the consideration of the illustrative example of FIG. 11, the NA graph indicates the contents of the NA portion of microinstruction register 16 (FIG. 1) during each cycle and thus indicates the assumed next microinstruction address in accordance with the double flow lines in FIG. 8. An "e" designation in the NA graph indicates that the next operator address register 29 contains the next microinstruction address. The next lower T graph in FIG. 9 indicates the particular set of system conditions selected by the CS portion (FIG. 5) of the sequence control word read out of sequence control memory 20 (FIG. 1) during each cycle, the T1, T2, etc. designations corresponding to like designated decision blocks in the microinstruction flow structure of FIG. 8 and to like designated CS values illustrated in FIG. 10. A T0 in graph T during cycle indicates that no system condition selection is required during the cycle in conformance with FIG. 8. The next lower Index graph in FIG. 11 indicates the index contained in the sub-portion selected by branch index selector 44 in FIG. 4 during each cycle in response to the states of the particular set of system conditions selected by system conditions selector 46 (FIG. 4).

The remaining graphs to be considered in FIG. 11 are the graphs designated Alt Addr Reg, Next Op FF, and Next Op Reg. The Alt Addr Reg graph indicates the microinstruction whose address resides in alternate address register 28 (FIG. 1) during a cycle as a result of being set up therein at the clock occurring at the end of the preceding cycle because an index 1, 2, 3 or 4 was selected by branch index selector 44 during the preceding cycle. The Next Op FF graph illustrates the true state of flip-flop 33 during a cycle as a result of being set up therein by the clock occurring at the end of the preceding cycle because an index 6 was selected by branch index selector 44 during the preceding cycle. The next Op Addr Reg graph in FIG. 11 indicates the starting microinstruction of the next operation to be performed whose address is contained in next operator register 29 in FIG. 1 for use in addressing the next microinstruction during a cycle in which the next operator flip-flop 33 is set. As illustrated in FIG. 11, the next operation register 29 is set at the first cycle of each new operation to the starting microinstruction address of the next operation.

Having identified the various graphs of FIG. 11, it will now be described how the preferred embodiment of the present invention advantageously provides microinstruction sequencing for performing the illustrative four consecutive operations $O_1 = A_1B_1C_1D_1$; $O_2 = A_2B_2K_2L_2$; $O_3 = A_3B_3C_3$; and $O_4 = A_4B_4P_4$ being considered herein. It will be understood from FIGS. 8 and 11 that these four operations require the execution of 14 microinstructions involving eight decision blocks, each of which requires testing in order to determine the next microinstruction. Yet, as shown by the Cycle graph in FIG. 9, these three operations are performed using just 18 cycles which is only four more than would be required if no branching possibilities were present.

Now considering FIG. 11 in more detail, it will be evident that the first operation $O_1$ comprised of microinstructions $A_1B_1C_1D_1$ and performed during cycles 1-4 conforms to the assumed flow illustrated for the microinstruction flow structure of FIG. 8. Thus, during each of cycles 1-4, the following occurs: (1) the designated microinstruction in microinstruction register 16 (graph M) during the cycle is executed; (2) the next microinstruction in microinstruction memory 14 is addressed in accordance with the assumed next address NA (graph NA, FIG. 11) also contained in microinstruction register 16 during the cycle; and (3) since no system condition selection is called for during the cycle (as indicated by a T0 value for graph T), sequence controller 25 (FIG. 4) does not interfere with the execution of the microinstruction in microinstruction register 16 during the current cycle, or the execution of the assumed next microinstruction in the next cycle. In cycle 4 (during which the last microinstruction $D_1$ of operation $O_1$ is executed) an end of operation "e" is correctly assumed, thereby causing address selector 18 to select the address of the starting microinstruction $A_2$ of operation $O_2$ contained in next operation register 29 for execution in the next cycle 5.

During cycles 5 and 6 the first two microinstructions $A_2$ and $B_2$ of operation $O_2$ are executed in the same manner as described for $A_1$ and $B_1$ of operation $O_1$, since the flow again conforms to that shown in the microinstruction flow structure of FIG. 8. However, since the correct next microinstruction following $B_2$ is $K_2$ and not the assumed microinstruction $C_2$, the selection of the set of system conditions corresponding to T1 during cycle 6 results in branch index selector 44 selecting sub-portion 301 of the branch index portion BI of SCW-T1 (FIG. 10). The thus selected Index 3 causes addr K to be selected from the alternate address portion AA of SCW-T1 which is set up in alternate address register 28 at the clock occurring at the end of cycle 6. Also, selection of sub-portion 301 of SCW-T1 during cycle 6 produces a true inhibit signal I2 (see I2 graph in FIG. 11) which causes flip-flop 32 (FIG. 1) to be set true by the clock occurring at the end of cycle 6, while at the same time preventing microinstruction register 16 from changing during cycle 6. As a result, cycle 7 serves as a correction cycle (as indicated by the "X's" provided for cycle 7), during which the true state of J inhibits execution of microinstruction $B_2$ still contained in microinstruction register 16 and the address of microinstruction $K_2$ set up in alternate address register 28 by the clock occurring at the end of cycle 6 is used for addressing the microinstruction control word MCW-K during cycle 7. Thus, during cycle 8 in FIG. 11, the correct next microinstruction $K_2$ will be contained in microinstruction register 16 and will thus be executed during cycle 8, following which the flow proceeds to perform the correctly assumed next microinstruction $L_2$ during cycle 9 in conformance with FIG. 8. Operation $O_2 = A_2B_2K_2L_2$ will thus be completed at the end of cycle 9.

Since the NA portion of MCW-L in FIG. 9 correctly assumes an "e" next microinstruction, the starting microinstruction $A_3$ of the next operation $O_3 = A_3B_3C_3$ contained in next operation register 29 is selected for execution during cycle 10 followed by execution of the correctly assumed next microinstructions $B_3$ and $C_3$ during cycles 11 and 12 in the same manner as previously described for $A_1B_1C_1$ of operation $O_1$. Because $C_3$ is the last microinstruction of operation $O_3$, the assumed next microinstruction $D_3$ is not correct. As a result, during cycle 12 when $C_3$ is executed, the subportion 601 (FIG. 10) of the branch index portion BI of sequence control word SC-T2 will be selected by branch index selector 44 (FIG. 4) resulting in the selection of a 6 index and a true state of I2 during cycle 12. Thus, cycle 13 will be a correction cycle during which signal J will be true to inhibit execution of microinstruction $C_3$ remaining in microinstruction register 16 (FIG. 1) during cycle 13, and the end of operation flip-flop 33 will be true to cause the address of the starting microinstruction $A_4$ of the next operation $O_4 = A_4B_4P_4$ contained in next operation register 29 to be selected for addressing microinstruction memory 14 during cycle 13. Thus, microinstruction $A_4$ and the correctly assumed next microinstruction $B_4$ will be performed during cycles 14 and 15. However, since the correct next microinstruction of operation $O_4$ is $P_4$ and not $C_4$ as assumed, sub-portion 401 of sequence control word SCW-T1 (FIG. 10) is selected during cycle 15 resulting in the provision of a correction cycle during the next following cycle 16, followed by execution of the correct microinstruction $P_4$ during cycle 17, the operations occurring during cycles 15 and 16 being as previously described for cycles 7 and 8 in FIG. 11.

In order to provide further insight into the flexibility which is possible using the microprogramming system provided for the preferred embodiment of the invention being described, a particular illustrative situation will be assumed with regard to the execution of microinstruction $Q_4$ of operation $O_4$ during cycle 18 in FIG. 11. It will be assumed that the system condition selection provided during cycle 18 in accordance with decision block T4 in FIG. 8 may produce a result indicating that microinstruction $Q_4$ which is concurrently being executed during cycle 18 should not be executed, and that, instead, operation $O_4$ should be terminated after completion of microinstruction $P_4$. This possibility may advantageously be implemented in the preferred embodiment by: (1) providing unconditional sequencing from P to Q (as illustrated in FIG. 8) which is achieved by choosing microinstruction control word MCW-P in FIG. 9 with an NA portion equal to addr Q and a sequence control portion equal to T0 indicating a no branch sequence; (2) providing T4 system condition selection concurrently with the execution of microinstruction Q along with an assumed "e" next microinstruction which is achieved by choosing microinstruction control word MCW-Q in FIG. 9 with an NA portion equal to "e" and a sequence control portion equal to SC-T4; and (3) providing a sub-portion 010 in the branch index portion BI of sequence control word SCW-T4 in FIG. 10 which, in the example of FIG. 11, is caused to be selected during cycle 18 when $Q_4$ is being executed in the event that the states of the set of selected system conditions (corresponding to T4) indicates that microinstruction $Q_4$ should not be executed. In such a case, as illustrated in FIG. 11, inhibit signal I1 will become true during cycle 18 to inhibit performance of $Q_4$, while still permitting the assumed next microinstruction "e" in the NA portion (NA graph in FIG. 11) of the microinstruction register 16 (FIG. 1) to cause the address of the starting microinstruction $A_5$ of the next following operation to be read out into microinstruction register 16 at the clock occurring at the end of cycle 18 for execution in the next cycle 19.

It will be understood that if the T4 system condition selection provided during cycle 18 indicates that $Q_4$ should be executed after which the operation should terminate, then a sub-portion 000 would be selected which would not inhibit microinstruction execution during cycle 18 so that operation $O_4$ would terminate without inhibiting the execution of $Q_4$.

Although the description of the invention provided herein has been primarily directed to particular illustrative embodiments in order to clearly demonstrate the basic principles of the invention and the manner in which it may be readily practiced so as to take advantage of the stated features and advantages, it is to be understood that many modifications and variations in structure, arrangement, components, operation and use are possible within the contemplated scope of the invention without departing from the spirit of the invention. The appended claims are accordingly intended to cover and embrace all such possible modifications and variations within the true spirit and scope of the invention.

What is claimed is:

1. In a microprogrammed data processing system, the combination comprising:

microinstruction memory means for storing selectively addressable microinstruction control words each containing a microinstruction to be executed and an accompanying sequencing control portion;

microinstruction memory output means coupled to said microinstruction memory means for storing a microinstruction control word read out therefrom;

microinstruction execution means coupled to said microinstruction output means for executing a current microinstruction contained in a microinstruction control word stored therein;

addressing means coupled to said microinstruction memory means and operable concurrently with said execution means for addressing said microinstruction memory means so as to read out a next microinstruction control word therefrom for storage in said output means after completion of the execution of said current microinstruction; and sequencing control means coupled to said microinstruction memory output means and operable concurrently with said execution means and said addressing means, said sequencing control means being responsive to a sequencing control portion currently stored in said output means and the states of selected system conditions for selectively providing first and second inhibiting actions, the first inhibiting action being such as to inhibit execution of the current microinstruction stored in said output means and the second inhibiting action being such as to prevent storage in said output means of said next microinstruction control word read out of said microinstruction memory means.

2. The invention in accordance with claim 1, wherein said sequencing control means selectively produces neither, one or both of first and second inhibit signals in response to said sequencing control portion and said selected means conditions, wherein said system includes storing means for storing the results of microinstruction execution, wherein said storing means are responsive to said first inhibit signal so as to prevent storage of microinstruction execution results therein when said first inhibit signal is produced, and wherein said output means is responsive to said second inhibit signal so as to prevent a microinstruction control word read out from said microinstruction memory means from being stored therein when said second inhibit signal is produced.

3. The invention in accordance with claim 2, wherein said storing means and said output means each operate in response to an applied clock signal and wherein each include a clock inhibiting circuit responsive to said first and second inhibit signals, respectively.

4. The invention in accordance with claim 1, wherein each microinstruction control word contains an assumed next microinstruction address portion, wherein said sequencing control means is responsive to said sequencing control portion and said selected system conditions for determining whether the assumed next microinstruction is the correct next microinstruction to be executed, wherein said sequencing control means is responsive to a determination that the assumed next microinstruction is the correct next microinstruction for causing neither of said first and second inhibiting actions to be produced, and wherein said sequencing control means is responsive to a determination that the assumed next microinstruction is not the correct microinstruction to cause at least one of said first and second inhibiting actions to be produced.

5. The invention in accordance with claim 4, wherein said sequencing control means is additionally responsive to said sequencing control portion and said selected system conditions for determining the correct next microinstruction address, and wherein said sequencing control means operates in response to an incorrect next microinstruction determination to cause said addressing means to depart from its normal addressing and to next address said microinstruction memory means with the correct next microinstruction address determined by said sequencing control means.

6. The invention in accordance with claim 5, wherein said sequencing control means operates to choose said selected system conditions in response to selection information derived from the sequencing control portion contained in a microinstruction control word stored in said output means.

7. The invention in accordance with claim 5, wherein said data processing system operates cyclically, wherein the execution by said execution means of a microinstruction in said output means, the addressing by said addressing means of a next microinstruction control for storage in said output means, and the correct next microinstruction determination and selective production of said inhibiting actions by said sequencing control means are all concurrently performable during a cycle of said system.

8. The invention in accordance with claim 5, wherein said sequencing control means is additionally operable in response to the determination of an incorrect assumed next microinstruction in a current cycle to selectively prevent execution of a microinstruction during the next cycle as well as during the current cycle.

9. The invention in accordance with claim 8, wherein said sequencing control means is operable in response to the determination of an incorrect assumed next microinstruction in a current cycle to cause said addressing means to address said microinstruction memory means in the next cycle with said correct next microinstruction address determined by said sequencing control means in the current cycle.

10. The invention in accordance with claim 9, wherein said sequencing control means includes sequence control memory means for storing selectively addressable sequence control words each containing a branch index portion and a condition select portion; wherein said sequence control memory means is addressed during a cycle to read out a selected sequence control word in response to the sequencing control portion contained in a microinstruction control word stored in said output means; wherein said selected system conditions are selected by said sequencing control means during a current cycle in response to the conditions select portion of a sequence control word read out from said sequence control memory means during the current cycle; and wherein said correct microinstruction address, the production of said first and second inhibiting actions, and the prevention of microinstruction execution in the next cycle are determined by said sequencing control means during a current cycle in response to the selected system conditions and the branch index portion of a sequence control word read out from said sequence control memory means during the current cycle.

11. The invention in accordance with claim 10, wherein each sequence control word additionally includes an alternate address portion indicating at least one alternate next microinstruction address, and wherein said sequencing control means is selectively operable in response to the branch index portion of a sequence control word read out from said sequence control memory means during a current cycle to select said alternate next microinstruction address as the correct next microinstruction address for use by said addressing means in the next cycle.

12. The invention in accordance with claim 10, wherein said microinstruction memory means and said sequence control memory means each comprise a programmable read-only memory.

13. In a microprogrammed data processing system which performs an operation using a microinstruction flow structure containing at least one branching point, the combination comprising:

microinstruction memory means for storing selectively addressable microinstruction control words, each microinstruction control word containing: (a) a microinstruction to be executed, (b) an assumed next address portion indicating the address of the microinstruction control word containing an assumed next microinstruction, and (c) a sequencing control portion for use in providing correct next microinstruction sequencing;

microinstruction execution means coupled to said microinstruction memory means for executing a microinstruction contained in a microinstruction control word read out therefrom;

addressing means coupled to said microinstruction memory means and operating concurrently with said execution means for normally addressing said microinstruction memory means to read out therefrom the microinstruction control word indicated by the next address portion accompanying the current microinstruction being executed; and sequencing control means coupled to said microinstruction memory means and operating concurrently with said execution means and said addressing means, said sequencing control means being responsive to the sequencing portion of a microinstruction control word read out from said microinstruction memory means and the states of selected system conditions for determining the correct next microinstruction to be executed;

said sequencing control means being responsive to a determination that the correct next microinstruction is not the assumed next microinstruction to prevent execution thereof and to cause said addressing means to depart from its normal addressing and to instead address said microinstruction memory means with the correct next microinstruction address determined by said sequencing control means; and said sequencing control means being responsive to a determination that the assumed next microinstruction is the correct next microinstruction to permit execution thereof without interference.

14. In a cyclically operating microprogrammed data processing system which performs an operation using a microinstruction flow structure containing at least one branching point, the combination comprising:

microinstruction memory means for storing selectively addressable microinstruction control words, each microinstruction control word containing: (a) a microinstruction to be executed, (b) an assumed next address portion indicating the address of the microinstruction control word containing an assumed next microinstruction, and (c) a sequencing control portion for use in providing correct next microinstruction sequencing;

microinstruction memory output means coupled to said microinstruction memory means for storing a microinstruction control word read out from said microinstruction memory means;

microinstruction execution means coupled to said microinstruction memory output means for executing during a cycle a microinstruction contained in a microinstruction control word stored in said output means;

addressing means coupled to said microinstruction memory means and operable concurrently with said microinstruction execution means during a cycle for normally addressing said microinstruction memory means so as to read out therefrom for storage in said output means in the next cycle the microinstruction control word indicated by the next address portion contained in a microinstruction control word stored in said output means during a current cycle; and sequencing control means coupled to said microinstruction memory output means and operable concurrently with said execution means and said addressing means during a cycle, said sequencing control means being responsive to the sequencing portion of a microinstruction control word stored in said output means and the states of selected system condition signals for determining during a cycle the correct next microinstruction to be executed;

said sequencing control means being responsive to a determination that the correct next microinstruction is not the assumed next microinstruction to prevent execution thereof in the next cycle and to cause said addressing means to depart from its normal addressing in the next cycle and to instead address said microinstruction memory means with the correct next microinstruction address determined by said sequencing control means during the current cycle; and said sequencing control means being responsive to a determination that the assumed next microinstruction is the correct next microinstruction to permit execution thereof in the next cycle without interference.

15. The invention in accordance with claim 14, wherein said sequencing control means includes sequence control memory means for storing selectively addressable sequence control words each containing a branch index portion and a condition select portion; wherein said sequence control memory means is addressed during a cycle to read out a selected sequence control word in response to the sequencing control portion contained in a microinstruction control word stored in said output means; wherein said selected system conditions are selected by said sequencing control means during a current cycle in response to the conditions select portion of a sequence control word read out from said sequence control memory means during the current cycle; and wherein the determination of said correct microinstruction address and the prevention of microinstruction execution in the next cycle are determined by said sequencing control means during a current cycle in response to the selected system condition signals and the branch index portion of a sequence control word read out from said sequence control memory means during the current cycle.

16. The invention in accordance with claim 15, wherein said sequencing control means is additionally selectively operable in response to said branch index portion to prevent further execution of a microinstruction contained in said output means during a current cycle.

17. The invention in accordance with claim 15, wherein each sequence control word additionally includes an alternate address portion indicating at least one alternate next microinstruction address, and wherein said sequencing control means is selectively operable in response to the branch index portion of a sequencing control word read out from said sequence control memory means during a current cycle to select said alternate next microinstruction address as the correct next microinstruction address for use by said addressing means in the next cycle.

18. The invention in accordance with claim 15, wherein said microinstruction memory means and said sequence control memory means each comprise a programmable read-only memory.

19. The invention in accordance with claim 14, wherein said sequencing control means selectively produces neither, one or both of first and second inhibit signals in response to said sequencing control portion and said selected system condition signals, wherein said system includes storing means for storing the results of microinstruction execution, wherein said storing means are responsive to said first inhibit signal so as to prevent storage of microinstruction execution results therein when said first inhibit signal is produced, and wherein said output means is responsive to said second inhibit signal so as to prevent a microinstruction control word read out from said microinstruction memory means from being stored therein when said second inhibit signal is produced.

20. The invention in accordance with claim 19, wherein said storing means and said output means each operate in response to an applied clock signal and wherein each include a clock inhibiting circuit responsive to said first and second inhibit signals, respectively.

21. The invention in accordance with claim 14, wherein the assumed next address portion contained in each microinstruction control word indicates the next following microinstruction when a no branch situation is presented by said microinstruction flow structure and indicates the most likely following next microinstruction when a branch situation is presented by said microinstruction flow structure.

22. In a microprogrammed data processing system, an improved method of providing for the sequencing of microinstructions in a microinstruction flow structure containing at least one branch point, said method comprising the steps of:

addressing a microinstruction memory so as to read out therefrom a selected one of a plurality of microinstruction control words stored therein, each microinstruction control word containing a microinstruction to be executed, an assumed next address portion indicating the address of the microinstruction control word containing an assumed next microinstruction, and a sequencing control portion, said assumed next address portion being chosen to indicate the next following microinstruction when a no branch situation is presented by said microinstruction flow structure and to indicate the most likely following next microinstruction in said microinstruction flow structure when a branch situation is presented by said microinstruction flow structure;

executing a microinstruction contained in a microinstruction control word read out of said microinstruction memory;

addressing said microinstruction memory concurrently with said executing and in accordance with the assumed next address portion accompanying the microinstruction being executed to read out the microinstruction control word containing the assumed next microinstruction to be executed;

determining the correct next microinstruction address concurrently with said executing and in response to selected system conditions and the sequencing control portion accompanying the microinstruction being executed;

executing the assumed next microinstruction read out from said microinstruction memory without interference if said determining indicates that it is correct;

inhibiting execution of the assumed next microinstruction read out from said microinstruction memory if said determining indicates that it is incorrect; and next addressing said microinstruction memory with the correct next microinstruction address obtained by said determining when the assumed next microinstruction address is incorrect.

23. The invention in accordance with claim 22, wherein said data processing system operates cyclically, wherein the first-mentioned step of executing, and the steps of addressing and determining are concurrently performable during each cycle, and wherein the steps of inhibiting execution and next addressing occur in the cycle next following the cycle during which the step of determining indicates an incorrect assumed next microinstruction.

24. The invention in accordance with claim 23, wherein the step of determining includes:

addressing a sequence control memory to read out a selected one of a plurality of sequence control words stored therein in response to the sequencing control portion of a microinstruction control word read out of said microinstruction memory, each sequence control word containing a branch index portion and a condition select portion;

selecting a set of system conditions in response to the condition select portion of a sequence control word read out of said sequence control memory; and determining the correctness of the assumed next microinstruction in response to the selected system conditions and the branch index portion of a sequence control word read out of said sequence control memory.

25. The invention in accordance with claim 24 including the step of selectively inhibiting execution of a microinstruction being executed during a current cycle in response to said selected system conditions and said branch index portion.

26. The invention in accordance with claim 23, wherein each sequence control word additionally includes an alternate address portion indicating at least one alternate next microinstruction address, and wherein the step of next addressing is selectively controllable in response to the step of determining to select said alternate next microinstruction address as the correct next microinstruction address for use in the next cycle.

* * * * *

UNITED STATES PATENT AND TRADEMARK OFFICE
CERTIFICATE OF CORRECTION

PATENT NO. : 4,155,120
DATED : May 15, 1979
INVENTOR(S) : David E. Keefer and Dongsung R. Kim It is certified that error appears in the above-identified patent and that said Letters Patent are hereby corrected as shown below:

Col. 1, line 30, change "mircoinstruc-" to --microinstruc---.
Col. 2, line 64, change "brancing" to --branching--.
Col. 14, line 22, between "during" and "cycle" insert --a--.
Col. 17, line 56, change "means" to --system--.

Signed and Sealed this

Ninth Day of October 1979

[SEAL]

Attest:

RUTH C. MASON
Attesting Officer

LUTRELLE F. PARKER
Acting Commissioner of Patents and Trademarks